United States Patent
Schurman et al.

(10) Patent No.: US 10,013,639 B1
(45) Date of Patent: Jul. 3, 2018

(54) ANALYZING DIGITAL IMAGES BASED ON CRITERIA

(71) Applicant: AMAZON TECHNOLOGIES, INC., Reno, NV (US)

(72) Inventors: Eric Michael Schurman, Seattle, WA (US); William Alexander Strand, Issaquah, WA (US); Jo-Pete Nelson, Auburn, WA (US); Yaodong Liu, Bellevue, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/107,968

(22) Filed: Dec. 16, 2013

(51) Int. Cl.
*G06K 9/62* (2006.01)
*G06F 17/30* (2006.01)

(52) U.S. Cl.
CPC ....... *G06K 9/623* (2013.01); *G06F 17/30247* (2013.01); *G06K 9/626* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,389,181 B2 | 5/2002 | Shaffer et al. | |
| 6,973,453 B2 | 12/2005 | Culp et al. | |
| 6,999,614 B1* | 2/2006 | Bakker et al. | 382/159 |
| 7,162,053 B2 | 1/2007 | Camara et al. | |
| 7,382,903 B2 | 6/2008 | Ray | |
| 7,716,157 B1* | 5/2010 | Bourdev | G06F 17/30256 |
| 7,822,426 B1 | 10/2010 | Wuersch | |
| 8,150,617 B2 | 4/2012 | Manber et al. | |
| 8,175,989 B1 | 5/2012 | Gopinath et al. | |
| 8,190,604 B2 | 5/2012 | Wen et al. | |
| 8,370,376 B2 | 2/2013 | Balduccini et al. | |
| 8,374,914 B2 | 2/2013 | Valencia-Campo et al. | |
| 8,447,828 B2 | 5/2013 | Issa | |
| 8,477,994 B1 | 7/2013 | Noshadi | |
| 8,520,909 B2 | 8/2013 | Leung et al. | |
| 8,527,492 B1 | 9/2013 | Issa | |
| 8,531,551 B2 | 9/2013 | Huberman et al. | |
| 8,560,553 B2 | 10/2013 | Bentley et al. | |

(Continued)

OTHER PUBLICATIONS

Da Rugna, Jérôme, and Hubert Konik. "Automatic blur detection for meta-data extraction in content-based retrieval context." Electronic Imaging 2004. International Society for Optics and Photonics, 2004. 10 pages.*

(Continued)

*Primary Examiner* — Ryan P Potts
(74) *Attorney, Agent, or Firm* — Lindauer Law, PLLC

(57) ABSTRACT

Digital images, such as digital photographs, are analyzed by an application running on a user device or other computing apparatus. Heuristics, characteristic detection or measurement techniques, or other analytics are used to evaluate individual digital images or to compare a plurality of digital images in accordance with user-input criteria. Digital images are then presented to a user as a result of the analysis, and further operations may be performed per user selections or input. Numerous digital images may thus be timely evaluated for aesthetic appeal, composition, subject matter content, or other factors, and then deleted, printed, distributed, or put other use.

20 Claims, 9 Drawing Sheets

(56) References Cited

U.S. PATENT DOCUMENTS

| | | |
|---|---|---|
| 8,572,086 B2 | 10/2013 | Soderberg et al. |
| 8,611,678 B2 | 12/2013 | Hanson et al. |
| 8,612,134 B2 | 12/2013 | Zheng et al. |
| 8,631,322 B2 | 1/2014 | Isomura et al. |
| 8,649,572 B2 | 2/2014 | Gokturk et al. |
| 8,755,559 B1 | 6/2014 | Dimitrov |
| 8,842,197 B2 | 9/2014 | Singh |
| 8,923,570 B2 | 12/2014 | Bennett et al. |
| 9,036,865 B2 | 5/2015 | Haas et al. |
| 9,037,583 B2 | 5/2015 | Nitesh |
| 9,049,388 B2 | 6/2015 | Gallagher et al. |
| 9,049,419 B2 | 6/2015 | Cheatle |
| 9,069,794 B1 | 6/2015 | Bandukwala et al. |
| 9,125,022 B2 | 9/2015 | Diacetis et al. |
| 9,127,950 B2 | 9/2015 | Raux et al. |
| 9,141,964 B1 | 9/2015 | Chan et al. |
| 9,460,348 B1 | 10/2016 | Adam et al. |
| 2002/0136590 A1 | 9/2002 | Himmel |
| 2003/0068100 A1* | 4/2003 | Covell ............... G06F 17/30256 382/305 |
| 2004/0064339 A1 | 4/2004 | Shiota et al. |
| 2004/0183918 A1 | 9/2004 | Squilla et al. |
| 2005/0050043 A1* | 3/2005 | Pyhalammi ........ G06F 17/30265 |
| 2006/0142942 A1 | 6/2006 | Pyo |
| 2007/0255618 A1 | 11/2007 | Meerbergen et al. |
| 2008/0147730 A1 | 6/2008 | Lee et al. |
| 2008/0183560 A1 | 7/2008 | Kaplan et al. |
| 2008/0209339 A1 | 8/2008 | MacAdaan et al. |
| 2009/0164301 A1 | 6/2009 | O'Sullivan et al. |
| 2009/0204488 A1 | 8/2009 | Leviev-Cohen |
| 2009/0222432 A1 | 9/2009 | Ratnakar |
| 2010/0057560 A1 | 3/2010 | Skudlark et al. |
| 2010/0082427 A1 | 4/2010 | Burgener et al. |
| 2010/0082647 A1 | 4/2010 | Chen |
| 2010/0311030 A1 | 12/2010 | He et al. |
| 2010/0312609 A1 | 12/2010 | Epshtein et al. |
| 2010/0332958 A1 | 12/2010 | Weinberger et al. |
| 2011/0022476 A1 | 1/2011 | Barkley et al. |
| 2011/0072047 A1 | 3/2011 | Wang et al. |
| 2011/0116726 A1* | 5/2011 | Hosaka ................... G06T 5/003 382/255 |
| 2011/0153629 A1 | 6/2011 | Lehmann et al. |
| 2011/0191271 A1* | 8/2011 | Baker ..................... G06Q 10/10 706/11 |
| 2011/0317928 A1* | 12/2011 | Yabu .................. G06K 9/00677 382/225 |
| 2012/0066573 A1 | 3/2012 | Berger et al. |
| 2012/0268612 A1* | 10/2012 | Wang ................. G06K 9/00624 348/207.1 |
| 2013/0051670 A1 | 2/2013 | Das et al. |
| 2013/0129142 A1 | 5/2013 | Miranda-Steiner |
| 2013/0202198 A1 | 8/2013 | Adam et al. |
| 2014/0029854 A1 | 1/2014 | Lyons et al. |
| 2014/0129627 A1* | 5/2014 | Baldwin ............... H04L 67/306 709/204 |
| 2014/0172570 A1 | 6/2014 | Y Arcas et al. |
| 2014/0179386 A1 | 6/2014 | Humphrey, Jr. |
| 2014/0301645 A1 | 10/2014 | Mattila |
| 2014/0301653 A1* | 10/2014 | Murphy-Chutorian .......... G06K 9/00221 382/224 |
| 2015/0088716 A1 | 3/2015 | Votaw et al. |
| 2015/0262221 A1 | 9/2015 | Nakano et al. |
| 2016/0148298 A1 | 5/2016 | Tang et al. |
| 2017/0140022 A1 | 5/2017 | Lou et al. |

OTHER PUBLICATIONS

Burke, Jeff A., "Non-Final Office Action dated Nov. 4, 2015," U.S. Appl. No. 14/108,261, The United States Patent and Trademark Office, Nov. 4, 2015.

Burke, Jeff A., "Non-Final Office Action dated Jan. 8, 2016", U.S. Appl. No. 14/108,325, The United States Patent and Trademark Office, Jan. 8, 2016.

Burke, Jeff A., "Final Office Action dated Jul. 26, 2016", U.S. Appl. No. 14/108,325, The United States Patent and Trademark Office, Jul. 26, 2016.

Burke, Jeff A., "Final Office Action dated May 20, 2016", U.S. Appl. No. 14/108,261, The United States Patent and Trademark Office, May 20, 2016.

Burke, Jeff A., "Final Office Action Dated Apr. 20, 2017", "U.S. Appl. No. 14/108,325, The United States Patent and Trademark Office, Apr. 20, 2017."

Burke, Jeff A., "Non-final Office Action dated Dec. 13, 2016", U.S. Appl. No. 14/108,325, The United States Patent and Trademark Office, Dec. 13, 2016.

Burke, Jeff A., "Advisory Action dated Aug. 17, 2016", U.S. Appl. No. 14/108,261, The United States Patent and Trademark Office, Aug. 17, 2016.

Henry, Thomas Haynes, "Non-final Office Action dated Oct. 6, 2016", U.S. Appl. No. 14/108,332, The United States Patent and Trademark Office, Oct. 6, 2016.

Burke, Jeff A., "Non-Final Office Action dated Oct. 27, 2016", U.S. Appl. No. 14/108,261, The United States Patent and Trademark Office, Oct. 27, 2016.

Burke, Jeff A., "Advisory Action dated Jul. 10, 2017", U.S. Appl. No. 14/108,261, The United States Patent and Trademark Office, Jul. 10, 2017.

Henry, Thomas Haynes, "Advisory Action dated Sep. 20, 2017", U.S. Appl. No. 14/108,332, The United States Patent and Trademark Office, Sep. 20, 2017.

Burke, Jeff A., "Final Office Action dated Apr. 20, 2017", U.S. Appl. No. 14/108,261, The United States Patent and Trademark Office, Apr. 20, 2017.

Burke, Jeff A., "Non-Final Office Action dated May 30, 2017", U.S. Appl. No. 14/108,325, The United States Patent and Trademark Office, May 30, 2017.

Henry, Thomas Haynes, "Final Office Action dated May 5, 2017", U.S. Appl. No. 14/108,332, The United States Patent and Trademark Office, May 5, 2017.

Burke, Jeff A., "Non-Final Office Action dated Sep. 14, 2017", U.S. Appl. No. 14/108,261, The United States Patent and Trademark Office, Sep. 14, 2017.

Burke, Jeff A., "Final Office Action dated Feb. 23, 2018", U.S. Appl. No. 14/108,261, The United States Patent and Trademark Office, Feb. 23, 2018.

Burke, Jeff A., "Final Office Action dated Jan. 8, 2018", U.S. Appl. No. 14/108,325, The United States Patent and Trademark Office, Jan. 8, 2018.

* cited by examiner

ANALYZING DIGITAL IMAGES BASED ON CRITERIA

BACKGROUND

Users often acquire a multitude of digital images, such as photographs, over the course of time or while attending a particular event. Expeditious sorting and processing of a large number of digital images is desirable.

Figure 1:
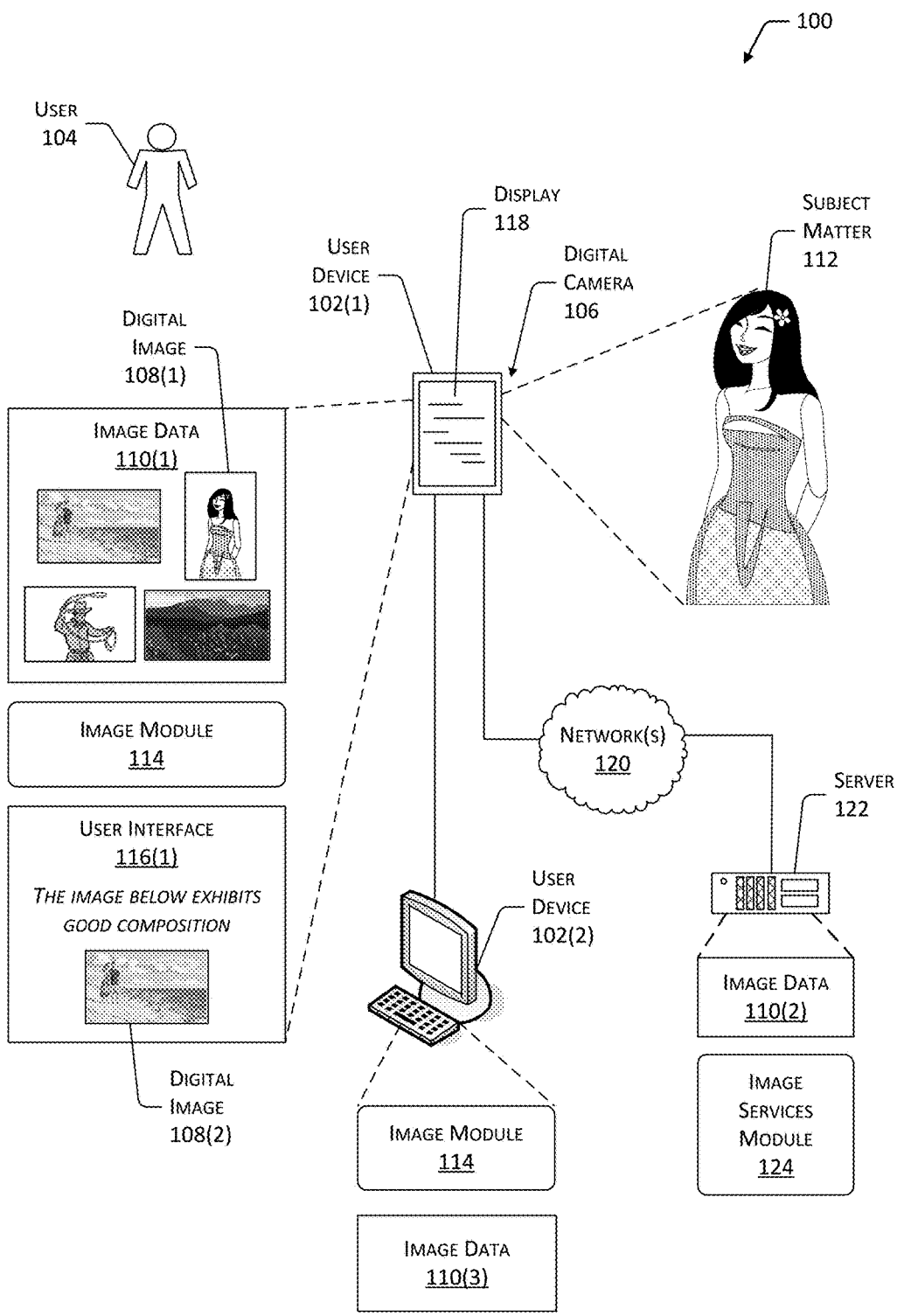
FIG. 1 depicts views including a user device, acquiring a digital image using a camera of the user device, and analyzing digital images using the user device and other elements within a system.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

U.S. Patent Application "Image Metadata Processing System", assigned U.S. patent Ser. No. 14/108,261, and as filed on Dec. 16, 2013 is hereby incorporated by reference in its entirety.

U.S. Patent Application "Image Metadata Search System", assigned U.S. patent Ser. No. 14/108,325, and as filed on Dec. 16, 2013 is hereby incorporated by reference in its entirety.

U.S. Patent Application "Content Interaction System", assigned U.S. patent Ser. No. 14/108,332, and as filed on Dec. 16, 2013 is hereby incorporated by reference in its entirety.

People take photographs in accordance with numerous events and including a vast array of different subject matter. Digital photography has been widely adopted due to the storage capacity of modern digital cameras or user devices, freedom from reloading or processing photographic film, and so on. As a result, many users have accumulated significant numbers of digital images over the years, or even during a relatively brief event such as weekend travel or a birthday party.

Unfortunately, not all photographs are visually appealing or considered to be of good quality. For instance, blurriness (i.e., image or portions unclear, or lacking sharp defining edges or lines), underexposure (i.e., too dark), overexposure (i.e., too light), a person or other subject matter that is "cut-off" in the frame, tilting of the frame relative to a noticeable reference like a horizon line, and other undesirable visible characteristics have plagued photographers for many years. For instance, a user sometimes inadvertently takes a photograph while their camera is within their pocket or a carrying case, resulting in a dark and useless image. In another instance, a user is pointing the lens of their camera directly at the ground when the shutter is unintentionally tripped. Other mishaps also occur, resulting in unwanted images. Digital photography has remedied these concerns to some extent, in so far as there is little or no incremental cost to taking several digital pictures of a given scene in the hopes of getting at least one "good shot".

On the other hand, some photographs exhibit excellent clarity, color balance, subject placement or composition, or other desirable characteristics and are considered exceptional. Many times, there are a number of such photographs in a person's collection, comingled with many other photographs of lesser appeal. Similarly, two or more photographers attending an event may collectively take several photographs of particular merit, as well as numerous others that they judge to be expendable.

Visually evaluating a plethora of digital photographs is a tedious and time consuming task. In one instance, a user seeks to delete all of the blurry, poorly exposed, or otherwise undesirable digital images they have accumulated. In another instance, a user wishes to quickly identify all of their digital images taken at a certain event or including a particular person or subject matter. In yet another instance, a user is learning the fundamentals of photographic composition and wants to determine if they have any digital images exhibiting a specific compositional rule. These and many other situations call for a potentially exhaustive search through a multitude of digital images, which may be completely mixed and stored without any prior classification or filing structure.

In one non-limiting illustration, a user employs a computer application running by way of one or more hardware processors. The user selects from predefined criteria, calling for the identification of all of their digital images having blurry content. The user may also specify a particular storage location or filename corresponding to the digital images to be considered.

The application accesses the specified digital images and analyzes each of them in accordance with a blur detection capability. Such blur detection may include heuristics, image content transforms, edge detection, or other processing or techniques. For example, a total of two thousand digital images are analyzed, and one hundred thirty of them include blurriness as detected by the application. Thus, these particular digital images are selected or flagged for additional action under the current operation.

Furthering the present illustration, the one hundred and thirty application-identified digital images are then presented to the user for visual scrutiny. For instance, thumbnail renderings may be presented for each image, wherein a larger view may be obtained by clicking on a particular image. The user may then select particular images for deletion by mouse clicking on respective controls, by keyboard entry, or by other user input. Alternatively, the user may actuate a control causing all of the identified images to be deleted from storage as a single operation. Other handling or actions may also be performed.

In another non-limiting illustration, a user operates a user device, such as a tablet computer, that includes a digital camera feature. The user employs the tablet computer to take several digital photographs at an office party. Eventually, one hundred digital images are acquired during the event, and the user wishes to view the five "best" images and present them to other partygoers.

The user then activates a computer application on the user device, and provides user input to the effect of: "show me the 5 best images within the office party folder". Such user input may be provided by way of a user interface presented by the application. The application parses or otherwise processes the user input such that a selection criteria is generated and formatted for further machine use in analyzing the digital images.

Continuing the present illustration, the application then analyzes the one hundred digital images stored within the office party folder using heuristics, detecting various compositional elements or arrangements, evaluating color balance and exposure, and so forth. In other words, the application is configured to evaluate the digital images individually such that various qualitative characteristics are identified or quantified. The digital images may also be ranked or scored in accordance with their respective quantification values.

The application thereafter selects those digital images receiving the five greatest ranking values, and presents them to the user by way of a display of the user device. The digital images may be presented one at a time in a slide-show manner, as thumbnails for individual selection and full-size viewing, and so forth. The five best digital images may also be individually or collectively selected for communication to a networked server, for distribution to other user devices or a printer by wireless signaling, and so on. Respective variations on the foregoing may also be used in accordance with the methods, devices, and systems described herein.

Numerous criteria are visual in nature, directed to one or more visible characteristics for selecting or analyzing digital images. Such "visual criteria" may include, but are not limited to: blurriness or portions out of focus, a lack of sharp defining edges or lines about objects, subject matter that is "cut-off" or extending to outside of the frame, over-exposure, under-exposure, presence of a particular person or object, compositional elements or techniques, detection of objects, colors, forms, or clothing or costumes associated with a particular holiday or special event, subject framing, illusion or freezing of motion, contrast, and so on. Generally, visual criteria are directed to the appearance or visible content of digital images. It is noted that many visual criteria are detected or evaluated using respective heuristics or analytics that are applied to the digital images themselves, and cannot be detected by way of metadata or other incidental information.

In comparison, some of the criteria may be directed to nonvisible characteristics for selecting or analyzing digital images having associated audio. Such "non-visual criteria" may include wind noise, inaudible speech, reverberation, and so forth.

FIG. 1 depicts views 100 including particular elements and operations performed by each. The views 100 are illustrative and non-limiting in nature, and other elements, devices, systems, or respective operations are also contemplated.

A user device 102(1) is depicted as a tablet computer. Numerous other types of user devices 102 may also be considered. The user device 102(1) is associated with a user 104. The user device 102(1) includes a digital camera 106 configured to capture digital images 108. The user device 102(1) includes image data 110(1) having a number of respective digital images 108. The image data 110(1) may be stored within a non-transitory computer-readable storage media (CRSM) of the user device 102(1).

As depicted, the user 104 uses the digital camera 106 to capture a digital image 108(1) of a subject matter 112. The digital images 108(1) may be stored within the image data 110(1) with other respective digital images 108. Such other digital images 108 may be acquired using the camera 106, received as respective file transfers from another user device 102 or apparatus, retrieved from a network device, and so forth.

The user device 102(1) also includes an image module 114. The image module 114 may include electronic circuitry, a processor or processors, application-specific integrated circuitry (ASIC), executable program code stored on CRSM, or other resources or constituency. The image module 114 is configured to store and retrieve digital images 108 within the image data 110(1), and to perform various analytical or comparative processes thereon in accordance with criteria or visual criteria specified or selected by the user 104.

In particular, the image module 114 may perform respective processes with respect to the digital images 108 using heuristics, digital signal processing, image characteristic detection or evaluation techniques, or other analytics or resources. The image module 114 may also quantify respective characteristics detected within the digital images 108. The image module 114 may further compare respective digital images 108 with each other and assign ranking or evaluation score values in accordance with the comparisons, the characteristic quantifications, or both. The image module 114 may be configured to perform other operations regarding the digital images 108, as well.

The image module 114 may also be configured to provide or generate different user interfaces 116 that are presented on a display 118. Each user interface 116 may present digital images 108, receive user 104 input by way of respective controls or other input devices, and so forth. As depicted, an illustrative user interface 116(1) presents a digital image 108(2), as well as an indication that the digital image 108(2) exhibits "good" composition. Other user interfaces 116 and their respective contents or functions may also be used.

The user device 102(1) is also configured to communicate digital images 108, information, data, or other matter with other user devices 102 or apparatus by way of one or more networks 120. The network(s) 120 may include or provide access to local-area networks (LANs), wide-area networks (WANs), the Internet, and so forth. As depicted, an illustrative server 122 is also configured to communicate with the user device 102(1) by way of the one or more networks 120.

The server 122 may include image data 110(2) having numerous digital images 108 stored therein, which may be selectively or collectively received from, or sent to, other apparatus such as the user device 102(1) by way of the network(s) 120. The server 122 may also include an image services module 124. The image services module 124 may include electronic circuitry, one or more processors, executable program code, or other resources.

The image services module 124 may further be configured to perform respective analytical, comparative, or evaluative operations with respect to the digital images 108. For instance, a user device 102 that is lacking an image module 114 may send one or more digital images 108 to the server 122, along with criteria to be used during analysis of the digital images 108. Such criteria may be directed, for example, to identifying all of the digital images 108 within a multitude that include the subject matter 112, or another specific person, object, location, and so forth.

The image services module 124 may then analyze the digital images 108, identifying those including the particular subject matter 112. The image services module 124 may then send a report back to the user device 102, which includes or identifies the particular digital images 108 consistent with the criteria. Other operations may also be performed by the image services module 124.

Also included is a user device 102(2), depicted as a desktop computer. The user device 102(2) may include the image module 114 as described above. For instance, the user device 102(1) may communicate one or more of the digital images 108 to the user device 102(2), where they are analyzed, compared, or processed in accordance with predetermined or user-specified criteria. In such an instance, the user device 102(1) performs a less "computationally intensive" role, uploading respective digital images 108 to the user device 102(2) for analysis or other operations. Other cooperative relationships between respective user devices 102 may also be defined or used. The user device 102(2) includes image data 110(3) having a number of respective digital images 108. The image data 110(3) may be stored within a non-transitory CRSM of the user device 102(2).

The image module 114, or the image services module 124, or both, may incorporate machine learning so as to perform one or more algorithms or techniques when analyzing digital images 108. Such machine learning may include unsupervised machine learning such as clustering, or the training of a classifier. Although clustering and classification are provided as examples of machine learning techniques that may be employed, implementations are not limited to these examples.

Implementations supporting machine learning algorithms may include, but are not limited to, one or more of the following: artificial neural networks, inductive logic programming, support vector machines (SVMs), Bayesian networks, decision tree learning, association rule learning, reinforcement learning, representation learning, similarity learning, metric learning, sparse dictionary learning, and so forth. In this way, selections, inputs, or other actions on the part of the user 104 may be used to improve or "evolve" various analyses, comparisons, or evaluations performed by the image module 114 or the image services module 124. For instance, the user 104 may habitually delete digital images 108 that include particular subject matter, or those that have relatively low contrast. In response, a machine learning algorithm within the image module 114 may adapt to select or recommend such images for deletion. In some implementations, the machine learning algorithm may implement a sparse autoencoder configured to perform deep learning on the preferences of the user 104. Nodes or synapses of the autoencoder may be monitored such that those which are active when a new image is applied to the autoencoder are used to determine whether that particular user 104 might want to mark the image as "delete" or "save."

The sparse autoencoder may be trained to learn or approximate an identity function according to one or more unsupervised learning methods. For example, a large dataset of images may be provided. An activation vector may be determined for a particular user 104 by applying a set of images that the user 104 has marked "save" or "delete" to the trained autoencoder. For example, generating vectors representative of the activations of the nodes in the trained neural network after the trained neural network has been provided with the user dataset may be determined. An activation vector may be determined when a new image (or set of images) is applied to the same trained autoencoder. For example, the set of images may include those recently acquired while using a camera or may be applied to images previously stored. When the activation vectors are similar or identical, the new images (or set of images) may be automatically marked as "save" or "delete". In some implementations, the autoencoder may be trained to identify elements in the images, such as faces, vehicles, and so forth.

The server 122 is illustrative of any number of computing devices that may be coupled to the one or more networks 120, and respectively configured to perform various operations with respect to the digital images 108. For example, such a computing device may host or maintain a social network where digital images 108 may be shared among numerous users 104. In another example, a computing device may be configured to provide backup data storage for digital images 108. In another example, a computing device may maintain a digital image sharing service wherein respective users 104 may exchange or offer to sell digital images 108. Other computing devices configured for or directed to other purposes may also be used.

Figure 2:
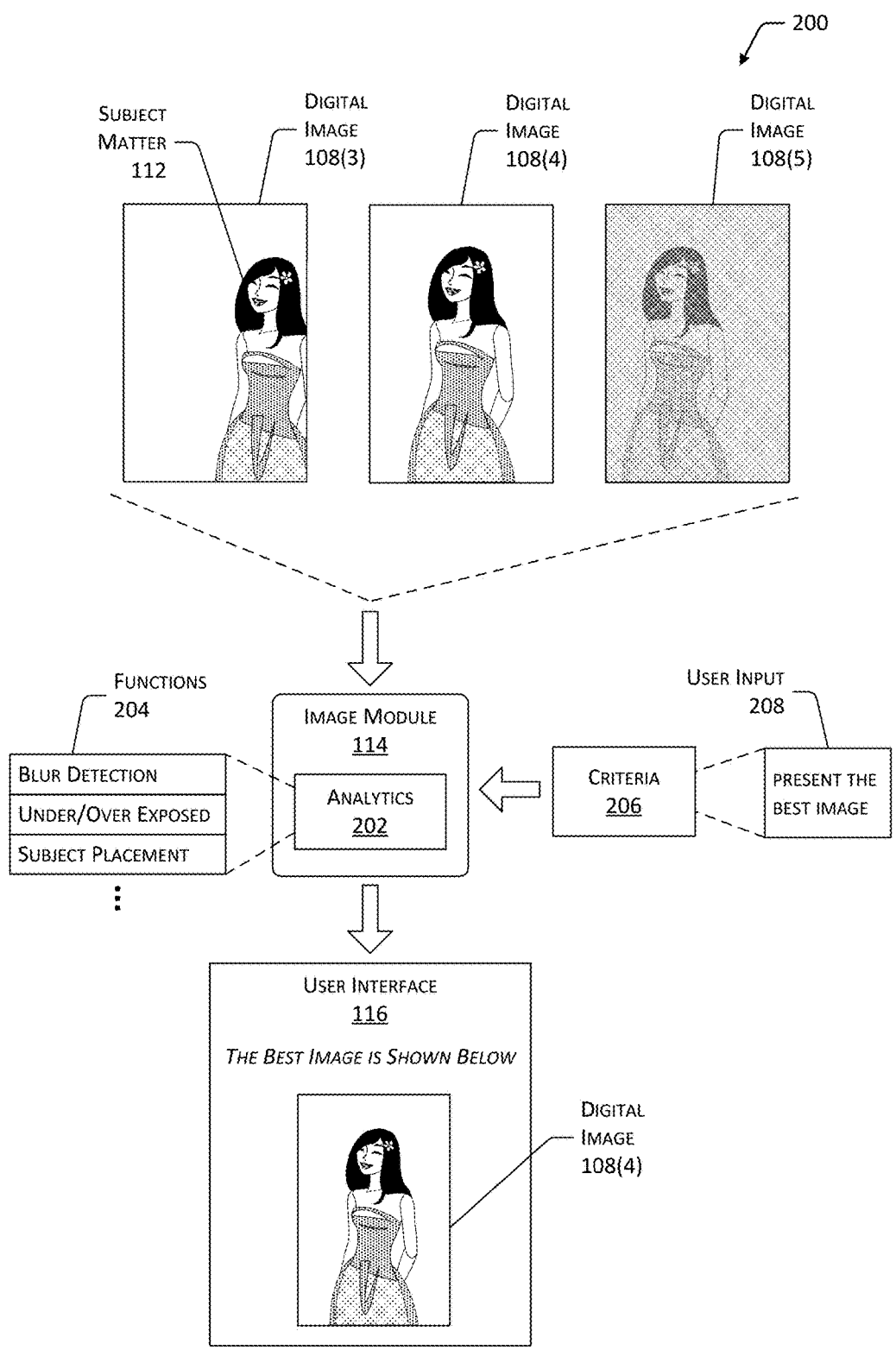
FIG. 2 depicts an operation wherein a best digital image of a plurality is selected by an apparatus and presented within a user interface.

FIG. 2 depicts views 200 including digital images 108 and an illustrative operation performed with respect to them. The views 200 are non-limiting in nature, and other elements, devices, systems, or respective operations are also contemplated.

Three respective digital images 108(3), 108(4), and 108(5) are depicted. Each of the digital images 108(3)-108(5) includes the same subject matter 112. However, each of the digital images 108(3)-108(5) includes respective qualitative and compositional characteristics—in short, the digital images 108(3)-108(5) are of varying aesthetic quality.

Specifically, the digital image 108(3) includes the subject matter 112, which is located off center and is "cut-off" within the frame. The digital image 108(4) is of relatively good quality, having proper exposure, centering of the subject matter 112, and so forth. In turn, the digital image 108(5) is underexposed and is "too dark", especially when compared to the digital image 108(4).

As depicted, the digital images 108(3)-108(5) are input to, or accessed by, an image module 114. The image module 114 includes analytics 202. The analytics 202 may be configured or applied to perform numerous functions 204 such as blur detection, underexposure or overexposure detection, subject placement determination, and so forth. The analytics 202 may include or use one or more heuristics, comparative techniques, signal filtering or processing, color or contrast evaluation, facial recognition, subject matter identification, or other functions.

The image module 114 is configured to operate in accordance with criteria 206, which may be defined or selected in accordance with a user input 208. As depicted, the user input 208 calls for the image module 114 to "present the best image". The criteria 206 may include machine-readable code or parameters that have been generated or translated from the user input 208.

The image module 114 then analyzes or evaluates the three digital images 108(3)-108(5) in accordance with the criteria 206, using the analytics 202 and its respective functions 204. The image module 114 selects the digital image 108(4) as having the greatest overall image quality or visual merit. The image module 114 then presents the digital image 108(4) within a user interface 116, designating it as the "best digital image". The "best" digital image 108(4) may be printed, transmitted to the server 122 for storage, distributed to various recipients by way of the network(s) 120 or by wireless signaling, and so forth.

The illustrative operation described immediately above goes to the evaluation and selection of one digital image 108 as the "best" of a plurality or set, in accordance with criteria 206 prescribed or selected by a user 104. In another instance, the user 104 may wish to have any underexposed or underexposed digital images 108 identified and deleted as an automatic operation. As such, the image module 114 may identify the digital image 108(5) as underexposed and delete that digital image 108(5) from image data 110 or other storage. Other analyses and presentations may be performed, potentially including automatic operations such as digital image 108 deletion, printing, distribution, storing within backup CRSM, and so forth.

Machine learning may be used during the evaluation or selection of a "best" digital image 108 from a plurality, while ranking or segregating digital images 108, or during numerous other operations. For example, the image module 114 may adjust or grow a decision tree, identify new similarities or distinctions, and so on, while analyzing one or more digital images 108 during a given operation. The image module 114 may then apply those learned aspects to present or future digital image 108 processing functions.

In some situations, a user 104 may take several digital images 108 with relatively little difference between them as to quality, visual appeal, or the like. For example, a user 104 may take numerous digital images 108 of a sunset or scenic vista that are all of relatively good quality. The image module 114 may be configured to analyze such digital images 108 so as to rank them, despite the narrow aesthetic differences between them, so that one or more may be deleted as an automatic operation, or in accordance with user 104 selection.

For example, if a number of digital images 108 are taken of a sunset scene, in close chronological succession, the image module 114 may rank these digital images 108 based on the angle of the sun above the horizon, the placement of trees or other silhouetted objects within the frame, images of birds or boats traveling across the frame, color diversity or gamut, and so on. Compositional rules or guidelines defining goals or "ideals" may be used in such a close-equivalency ranking situation. Other ranking techniques may also be used.

In another instance, the image module 114 may be configured to perform various analyses, comparisons, or processes with respect to digital images 108 in an autonomous or "background" manner, in accordance with predefined or default criteria. That is, the image module 114 may operate without specific invocation by a user 104. For instance, the image module 114 of the user device 102(1) may automatically analyze digital images 108 as each is acquired by the digital camera 106, flagging, sorting, or segregating those that include blurry image content, that are under- or overexposed, and so on. In another instance, the image module 114 may be configured to automatically identify and store, or flag, the "best" of a plurality digital images 108 acquired while attending a certain event.

Digital images 108 selected by the image module 114 may be sent to a backup service or "cloud server" for storage, or to a social media website or digital image sharing service. For instance, the image module 114 may be configured, or trained through machine learning, to select the "best" digital images 108 for backup storage. In another instance, digital images 108 may be ranked by the image module 114 and sent to two or more different storage or backup services based on those rankings, the user 104 cost to subscribe to or maintain those respective backup services, or in accordance with other criteria. In yet another instance, the image module 114 may be configured to identify particular persons or places within digital images 108 and upload those images to a social media website. Other operations may also be performed.

At least some such operations may be performed without specific user criteria or request, as a "pre-evaluation" function. Thereafter, the user 104 may be queried regarding additional actions to be taken with respect to pre-evaluated digital images 108, such as deletion, separate filing, and so on. Additional pre-evaluation functions may be incorporated in accordance with machine learning adaptations. That is, machine learning within the image module 114 may evolve in accordance with user 104 selections or inputs such that less user 104 intervention is needed over time to accomplish the same or analogous operations. In another instance, such pre-evaluation functions may be performed by an image module 114 incorporated within a digital camera. Other operations may also be performed by the image module 114 in a generally autonomous manner without user 104 intervention or triggering.

Figure 3:
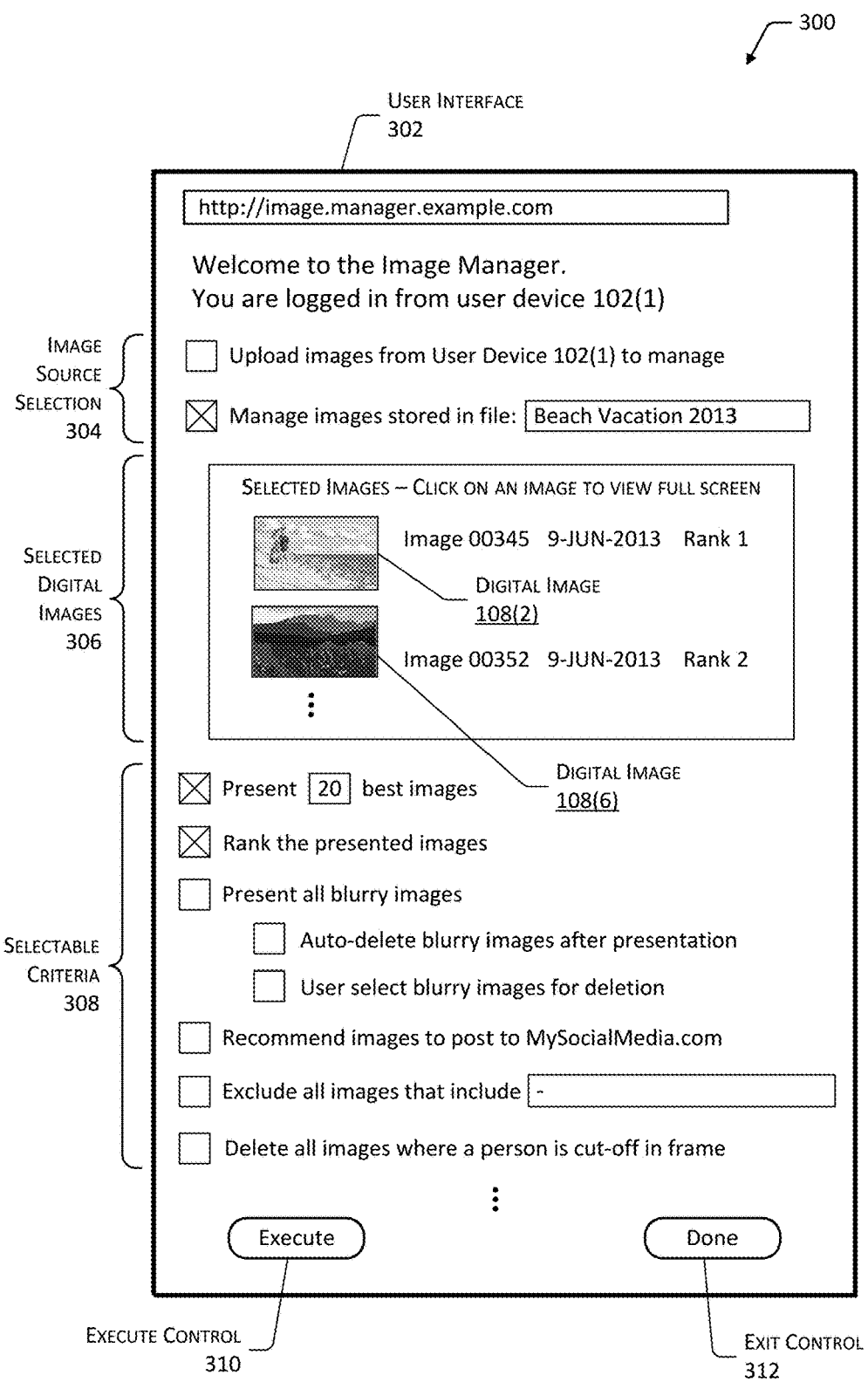
FIG. 3 depicts an illustrative user interface corresponding to analyzing digital images according to user determined criteria.

FIG. 3 depicts views 300 including an illustrative user interface 302 and respective features thereof. The views 300 are illustrative and non-limiting in nature, and other elements, features, or user interfaces are also contemplated.

In this implementation, the user interface 302 is provided by the image services module 124 of the server 122. Other similar or respectively varying user interfaces 116 may be provided by an image module 114 of a user device 102. The user interface 302 includes image source selections 304. A user 104 may input or select a source of digital images 108 to be processed in accordance with other inputs or selections made through the user interface 302. As depicted, the user 104 may select either the user device 102(1) as the source of digital images 108, or input a file or location name for accessing digital images 108. As further depicted, the user has selected to process digital images 108 that are stored within a digital file folder named "Beach Vacation 2013". Other digital image 108 selection controls or features may also be used.

The user interface 302 may also include a window for presenting selected digital images 306. As depicted, two digital images 108(2) and 108(6) are presented as thumbnails within the selected digital images 306. Information regarding the respective digital images 108(2) and 108(6) is also presented, including file names, acquisition dates, and ranking numbers. Other types of information or data may also be presented.

The user interface 302 may also include respective selectable criteria 308. Numerous illustrative and non-limiting selectable criteria 308 are depicted. For instance, the user 104 has selected to have the twenty "best" digital images 108 within the "Beach Vacation 2013" digital folder identified, ranked, and presented. Other selectable criteria 308 such as recommendations to send to social media, detection or deletion of blurry images, and so on, may also be selected.

The user interface 302 may also include an "Execute" control 310 and an "Exit" control 312. The execute control 310, when actuated by the user 104, causes the image services module 124 to perform one or more operations in accordance with the selectable criteria 308. The digital images 108(2) and 108(6) depicted within the selected digital images 306 correspond to those identified and selected, according to the selected criteria. The image services module 124 may use heuristics, comparative filters, signal processing, or other techniques or analytics 202 in order to process or evaluate the relevant digital images 108. The exit control 312 may cause the user interface 302 to close, to trigger the presentation of other user interfaces, or return the user 104 to another application on the user device 102(1), and so forth.

In some implementations the identified images may have metadata indicative of their selection or the other characteristics stored. For example, the image module 114 or the image services module 124 may be configured to generate metadata which indicates which images are ranked as best, which are blurry, and so forth. Generation of the metadata is discussed in more detail with regard to the patent application "Image Metadata Processing System", which is incorporated by reference in its entirety.

Once generated, the metadata may be searched by way of the techniques described in the patent application "Image Metadata Search System", which is incorporated by reference in its entirety. For example, the user 104 may search for content and may include as search criteria an indication to return non-blurry (sharp) images.

In some implementations the image manager may provide the user 104 with the opportunity to generate enhanced content. For example, the user 104 may request generation of photo albums, virtual environments, and so forth, based on the images. This is described in the patent application "Content Interaction System".

Figure 4:
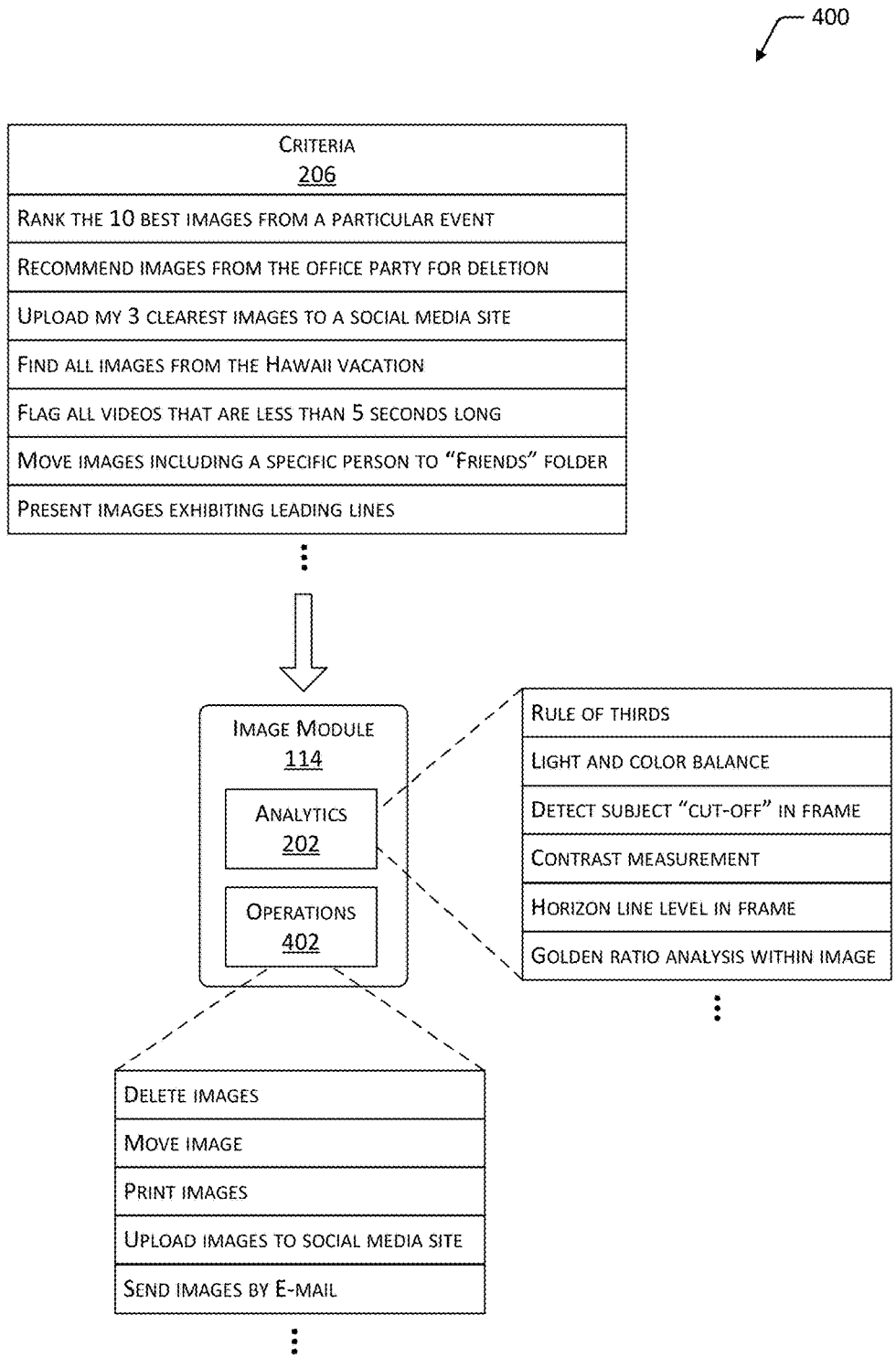
FIG. 4 depicts an image module for analyzing digital images, and illustrative analytics and criteria usable therewith.

FIG. 4 depicts views 400 including an image module 114 and related elements. The views 400 are illustrative and non-limiting in nature, and other image modules 114, elements, features, or functions may also be used.

The image module 114 may be defined or configured as described elsewhere herein. Also depicted are analytics 202, as used by or incorporated within the image module 114. The analytics 202 may be configured to detect, evaluate, or quantify various respective characteristics of digital images 108. For instance, some of the analytics 202 may correspond to classical photographic principles such as the "rule of thirds" or the "golden ratio". Others of the analytics 202 may correspond to quantifiable aspects such as color content or gamut, level horizon-line detection, and so forth. Other analytics 202, heuristics, and so on may also be used to process digital images 108.

Also depicted are operations 402. The operations 402 represent illustrative and respective functions that may be performed by the image module 114 with respect to selected or identified digital images 108. For example, the operations 402 may delete selected digital images 108, move digital images 108 between respective folders, attach a selected digital image or images 108 to an outgoing e-mail, and so on. Generally, the operations 402 include various actions that may be performed on or using digital images 108 that are identified or selected using the analytics 202 in accordance with criteria 206. In some implementations the operations 402 may be executed as part of a workflow.

Further depicted are criteria 206, as input to the image module 114 such that particular analyses, evaluations, or digital image 108 selections are performed. For instance, some of the criteria 206 are used to identify digital images 108 that include particular matter, or exhibit certain compositional characteristics. Other criteria 206 correspond to selecting digital images 108 of relatively greater quality or visual appeal. Still other criteria 206 are directed to detecting defects or undesirable characteristics within the digital images 108 under scrutiny. Other criteria 206 respectively directed to other objectives may also be used.

One or more of the respective analytics 202 may be selected and used during an analysis of digital images 108 in accordance with the criteria 206 for that analysis. For instance, if the user 104 has selected criteria 206 to the effect of "present all of my blurry digital images", then the image module 114 may be configured to use one or more particular analytics 202 such as edge detection, focus analysis, or other corresponding techniques. In another instance, the user 104 may prescribe criteria 206 to the effect of "show me all images that include Jill". As such, the image module 114 may employ facial recognition resources, subject matter identification capabilities, or other corresponding analytics 202. From one perspective, the criteria 206 define the objective(s) for respective analyses, wherein corresponding analytics 202 are selected and used accordingly. In turn, one or more operations 402 may be performed as a result of the analyses, in accordance with the criteria 206.

Figure 5:
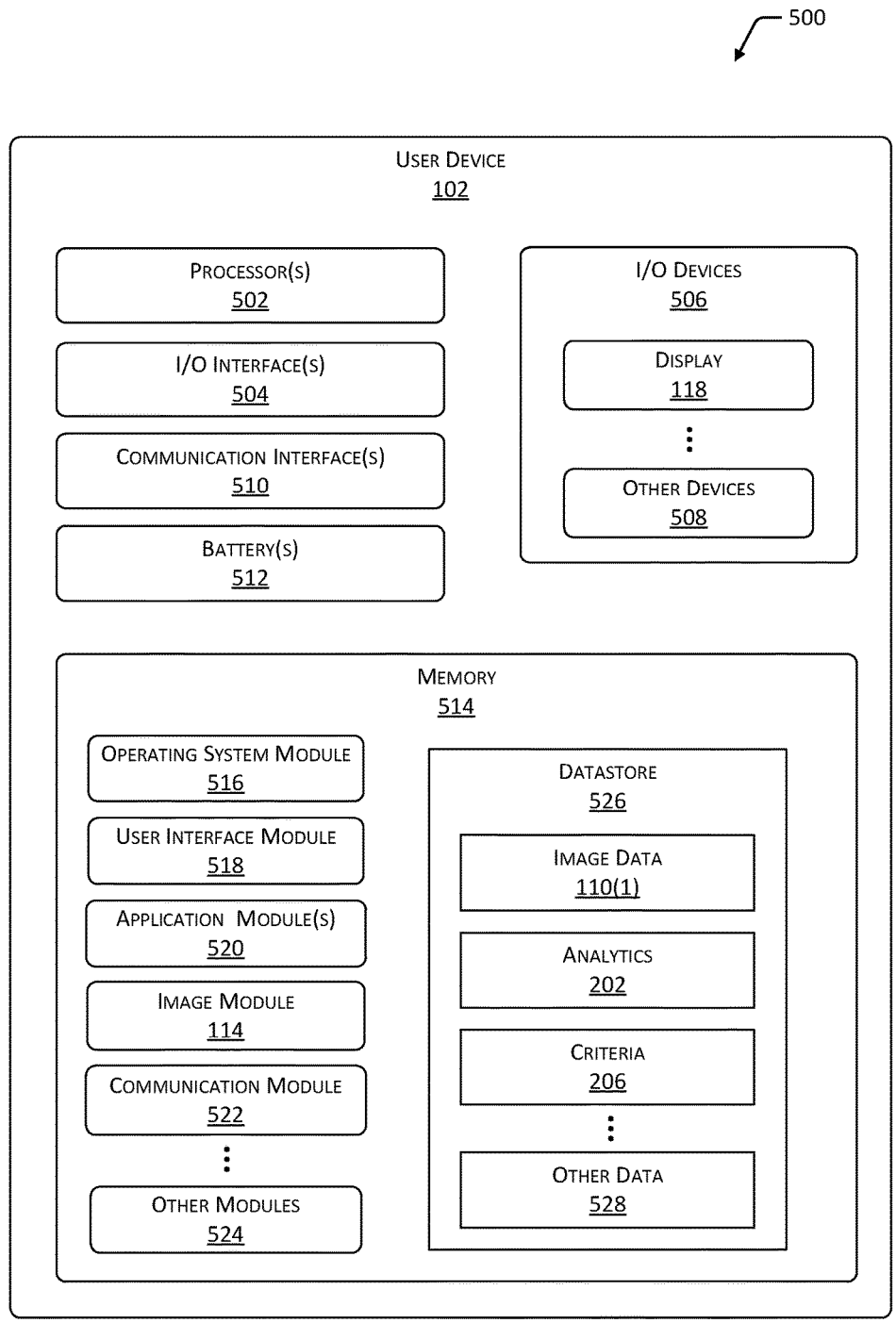
FIG. 5 is a block diagram depicting a user device.

FIG. 5 illustrates a block diagram 500 of a user device 102. The user device 102 is illustrative and non-limiting, and may be defined by a tablet computer, a wearable computer, an e-book reader, a media device, a cellular phone, a laptop computer, a digital camera, a desktop computer, a security camera system, a server, or another suitable apparatus. The user device 102 may include one or more processors 502 configured to execute one or more stored instructions. The processor(s) 502 may comprise one or more cores, and may also be referred to as hardware processors.

The user device 102 may include one or more I/O interface(s) 504 to allow the processor(s) 502 or other portions of the user device 102 to communicate with various other user devices 102, other computing devices, the server 122, web-based resources, and so on. The I/O interfaces 504 may comprise, or be configured to implement, one or more protocols such as I2C, SPI, USB, RS-232, and so forth.

The I/O interface(s) 504 may couple to one or more I/O devices 506. The I/O devices 506 may include one or more input devices such as a keyboard, a mouse, a microphone, a digital camera 106, user input buttons, and so forth. The I/O devices 506 may also include output devices such as one or more displays 118, audio speakers, haptic output devices, and so forth. In some embodiments, the I/O devices 506 may be physically incorporated within the user device 102, or they may be externally placed. The I/O devices 506 may include various other devices 508, as well.

The user device 102 may also include one or more communication interfaces 510. The communication interfaces 510 are configured to provide communications with other user devices 102, web-based resources, servers 122, routers, wireless access points, and so forth. The communication interfaces 510 may include wireless functions, devices configured to couple to one or more networks including PANs, LANs, WLANs, WANs, and so forth. The user device 102 may also include one or more batteries 512 for providing electrical power during normal operations. The battery or batteries 512 may be rechargeable or disposable in nature. The user device 102 may also include one or more busses or other internal communications hardware or software that allow for the transfer of data between the various modules and components of the user device 102.

The user device 102 includes one or more memories 514. The memory 514 comprises one or more computer-readable storage media (CRSM). The memory 514 provides storage of computer readable instructions, data structures, program modules, and other data used during the operation of the user device 102. The memory 514 may include at least one operating system (OS) module 516. Respective OS modules 516 are configured to manage hardware devices such as the I/O interfaces 504, the I/O devices 506, the communication interfaces 510, and provide various services to applications or modules executing on the processors 502.

Also stored in the memory 514 may be one or more of modules 518-524. The modules 518-524 may be executed as foreground applications, background tasks, and so forth. A user interface module 518 may be configured to provide one or more user interfaces 116, and may also provide one or more application programming interfaces. The user interface module 518 may be configured to operate with information encoded as hypertext markup language ("HTML") files, extensible markup language ("XML") files, or in another suitable format or language. The user interface module 518 is configured to accept inputs and send outputs using the I/O interfaces 504, the communication interfaces 510, or both.

The memory 514 may also store one or more of the application modules 520. Non-limiting examples of the application modules 520 include a word processing application, a spreadsheet application, a technical drawing or illustrating application, a photo editing application, a web browsing application, a portable document viewing application, and so on. The memory 514 may also include the image module 114 as described elsewhere herein.

The memory 514 may further store a communications module 522 such that signaling may be communicated to and from the user device 102. In one example, the communications module 522 includes executable program code, electronic circuitry, or other resources used to transmit and receive wireless signals. In another example, the communications module 522 includes resources used to send and receive signals by way of wired or optical signaling pathways. Other types or configurations of the communications module 522 may also be used.

The memory 514 may also include one or more other modules 524. Non-limiting examples of the other modules 524 may include cellular communications resources, a watchdog or other timer, a wireless internet transceiver, resources for satellite communications or navigation, and so forth.

The memory 514 may also include a datastore 526 to store information. The datastore 526 may use a flat file, database, linked list, tree, executable code, or other data structure to store the information. In some implementations, the datastore 526 or a portion of the datastore 526 may be distributed across one or more other user devices 102 or computing devices including servers 122, network attached storage apparatus, and so forth.

The datastore 526 may store image data 110(1) as described elsewhere herein. The image data 110(1) may include one or many digital images 108, as well as information or other data pertaining thereto. The image data 110(1) may also be structured such that respective digital image 108 folders or "albums" are defined and maintained. The image data 110(1) may also include information associated with one or more users 104.

The datastore 526 may further include various analytics 202 as described elsewhere herein. That is, the analytics 202 may include, without limitation, respective heuristics, analytical rules, compositional rules or definitions, content or image characteristic detectors, comparative techniques, qualitative measuring schemes, and so on, that are selectively applicable when analyzing or evaluating one or more digital images 108.

The datastore 526 may also include one or more criteria 206. The criteria 206 may define respective objectives or goals for the analysis or evaluation of one or more digital images 108. Illustrative and non-limiting examples of the criteria 206 are described elsewhere herein. The datastore 526 may also store other data 528. For example, the other data 528 may include one or more data structures that may be queried, modified, amended, and so forth. The other data 528 may also include encryption keys or codes used to access the image data 110(1), or when communicating with network-based resources such as the server 122, and so forth. Accordingly, respective user devices 102 may be resourced and configured to perform numerous functions, as well as to cooperate with one or more other user devices 102 or apparatus.

Figure 6:
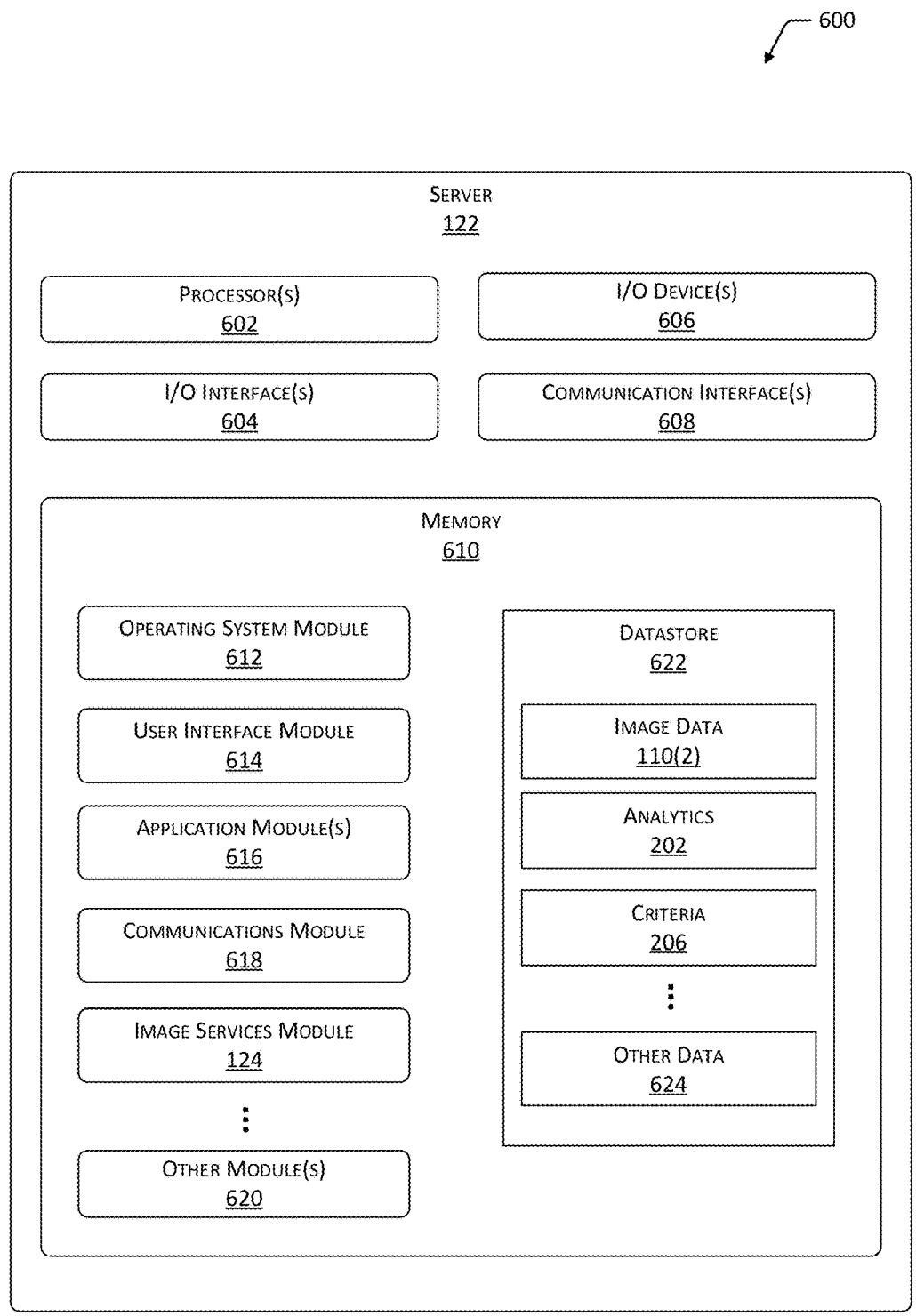
FIG. 6 is a block diagram depicting a server.

FIG. 6 illustrates a block diagram 600 of a server 122. The server 122 is illustrative and non-limiting, and may be defined by a rack-mounted server or another suitable apparatus. The server 122 may include one or more processors 602 configured to execute one or more stored instructions. The processor(s) 602 may comprise one or more cores, and may also be referred to as hardware processors.

The server 122 may include one or more I/O interface(s) 604 to allow the processor(s) 602 or other portions of the server 122 to communicate with various user devices 102, other servers 122, computing devices, web-based resources, and so on. The I/O interfaces 604 may comprise I2C, SPI, USB, RS-232, and so forth.

The I/O interface(s) 604 may couple to one or more I/O devices 606. The I/O devices 606 may include one or more input devices such as a keyboard, a mouse, a microphone, a camera, user input buttons, and so forth. The I/O devices 606 may also include output devices such as one or more displays, audio speakers, haptic output devices, and so forth. In some embodiments, the I/O devices 606 may be physically incorporated within the server 122, or they may be externally placed.

The server 122 may also include one or more communication interfaces 608. The communication interfaces 608 are configured to provide communications with other servers 122, various user devices 102, web-based resources, routers, wireless access points, and so forth. The communication interfaces 608 may include wireless functions, devices configured to couple to one or more networks including PANs, LANs, WLANs, WANs, and so forth. The server 122 may also include one or more busses or other internal communications hardware or software that allow for the transfer of data between the various modules and components of the server 122.

The server 122 includes one or more memories 610. The memory 610 comprises one or more CRSM. The memory 610 provides storage of computer readable instructions, data structures, program modules, and other data for the operation of the server 122. The memory 610 may include at least one operating system (OS) module 612. Respective OS modules 612 are configured to manage hardware devices such as the I/O interfaces 604, the I/O devices 606, the communication interfaces 608, and provide various services to applications or modules executing on the processors 602.

Also stored in the memory 610 may be one or more of the following modules. These modules may be executed as foreground applications, background tasks, and so forth. A user interface module 614 may be configured to provide one or more user interfaces, such as the user interface 302, in accordance with signaling or commands from the image services module 124. The user interface module 614 may also provide one or more application programming interfaces. The user interface module 614 may be configured to operate with information encoded as hypertext markup language ("HTML") files, extensible markup language ("XML") files, or in another suitable format or language. The user interface module 614 is configured to accept inputs and send outputs using the I/O interfaces 604, the communication interfaces 608, or both.

The memory 610 may also store one or more application modules 616. Non-limiting examples of the application modules 616 include a word processing application, a data encrypting or decrypting application, a data structure generation or management application, a web browsing application, a portable document generating or viewing application, and so on.

The memory 610 may further store a communications module 618 such that signaling, data, or digital images 108 may be communicated to and from respective user devices 102. In one example, the communications module 618 includes executable program code, electronic circuitry, or other resources used to transmit and receive wireless signals, signals by way of wired or optical pathways, or in accordance with other techniques. The memory 610 may also store the image services module 124 as described elsewhere herein.

The memory 610 may also include one or more other modules 620. Non-limiting examples of the other modules 620 may include cellular communications circuitry, a watchdog or other timer, a wireless internet receiver, secured data handling or communications resources, and so forth.

The memory 610 may also include a datastore 622 to store information. The datastore 622 may use a flat file, database, linked list, tree, executable code, or other data structure to store the information. In some implementations, the datastore 622 or a portion of the datastore 622 may be distributed across one or more other servers 122 or computing devices, network attached storage apparatus, and so forth.

The datastore 622 may store image data 110(2) as described elsewhere herein. The image data 110(2) may include one or more digital images 108, as well as information or other data pertaining thereto. The datastore 622 may also store image data analytics 202 as used by the image services module 124. The datastore 622 may also store various criteria 206 as described elsewhere herein. The datastore 622 may further store other data 624. For example, the other data 624 may include one or more data structures that may be queried, modified, amended, and so forth.

Figure 7:
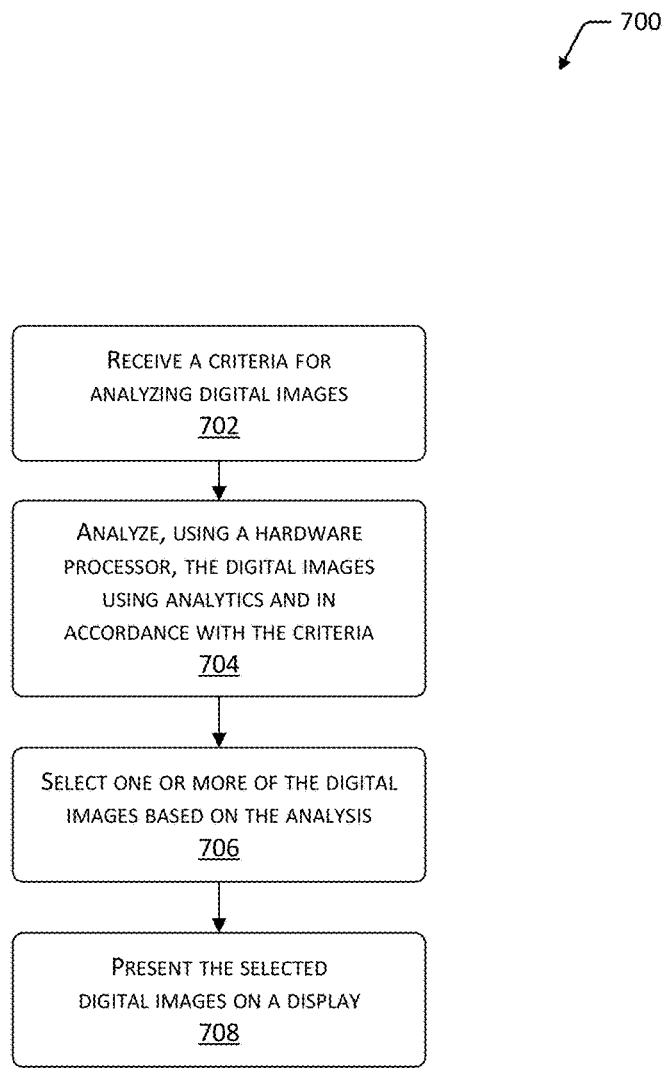
FIG. 7 is a flow diagram of an illustrative process including analyzing and presenting digital images according to received criteria.

FIG. 7 is a flow diagram 700 illustrating a process including analyzing and selecting digital images 108 in accordance with criteria 206. The process of the flow diagram 700 is illustrative and non-limiting, and other processes including one or more other steps, omitting one or more of the depicted steps, or proceeding in other orders of execution, may also be used.

Block 702 receives criteria 206 for analyzing digital images 108. For purposes of a present example, the user 104 seeks to determine if any of their stored digital images 108 exhibit good composition. The user 104 provides user input 208 to their user device 102(1) to the effect of "show me my images that have good composition." The image module 114 parses and processes the user input 208 such that a corresponding criteria 206 is generated.

Block 704 analyzes the digital images 108 using analytics 202 in accordance with the criteria 206. In the present example, the image module 114 accesses image data 110(1) stored within the user device 102(1), and analyzes respective digital images 108 therein. The analysis may employ selected heuristics, apply one or more predefined compositional rules, detect various characteristics within the respective digital images 108, and so on, in accordance with the criteria 206.

Block 706 selects one or more of the digital images 108 based on the analysis. In the present example, four particular digital images 108 may be identified that illustrate one or more compositional techniques. For instance, two of the digital images 108 may exhibit the "rule of thirds" regarding placement of the primary subject matter—such as people—within the frame. A third digital image 108 may exhibit good portrait formatting, while a fourth digital image 108 exhibits good exposure and contrast within a sunset scene—a traditionally difficult matter to photograph well. These four respective digital images 108 are selected by the image module 114 as consistent with the criteria 206.

Block 708 presents the selected digital images 108 on a display 118. In the present example, the image module 114 causes the four selected digital images 108 to be presented on the display 118 as respective thumbnails. The user 104 may click on or otherwise select from the presented digital images 108 so as to view an expanded or "full screen" rendering, send one or more of the digital images 108 to a printer, or perform other actions.

Figure 8:
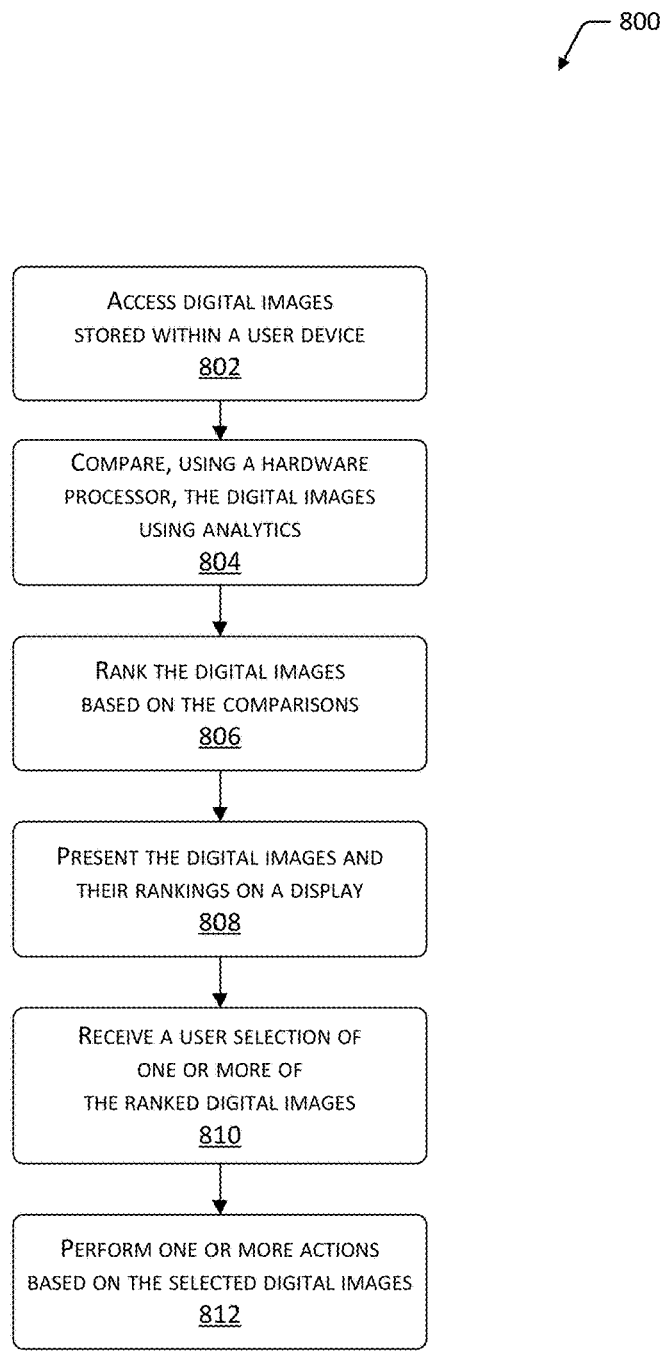
FIG. 8 is a flow diagram of an illustrative process including evaluating and ranking a plurality of digital images.

FIG. 8 is a flow diagram 800 illustrating a process including ranking digital images 108 and presenting them on a display 118. The process of the flow diagram 800 is illustrative and non-limiting, and other processes including one or more other steps, omitting one or more of the depicted steps, or proceeding in other orders of execution, may also be used.

Block 802 accesses digital images 108 stored within a user device 102. For purposes of a present example, an image module 114 operating on a user device 102 accesses image data 110 stored on CRSM. For instance, the image data 110 includes twelve digital images 108 taken by the user 104 while on a recent hiking trip in a mountainous area.

Block 804 compares, using a hardware processor 502, the digital images 108 using analytics 202. The image module 114 compares the twelve digital images 108 using various analytics 202. Such analytics 202 may include heuristics, characteristic detection or measurement tools, signal processing, color or gamut analysis, subject identification, or other functions. In this way, the image module 114 evaluates the respective digital images 108 in accordance with their own content, composition, aesthetic merits, and so on, and compares the digital images 108 to each other in accordance with these or other characteristics.

Block 806 ranks the digital images 108 based on the comparisons. In the present example, the image module 114 assigns a ranking value to each of the twelve digital images 108 based on the analysis performed at 804 above. Thus, a hierarchy of the digital images 108 is determined based upon various quantifiable image-content factors.

Block 808 presents the digital images 108 and their rankings on a display 118. In the present example, the image module 114 causes the twelve digital images 108 to be presented as thumbnails on the display 118, along with their respective rankings, in descending order. The ranked digital images 108 may be presented, for instance, as part of a user interface 116 wherein controls are also presented to receive user 104 selections or command inputs.

Block 810 receives a user 104 selection of one or more of the ranked digital images 108. In the present example, the user 104 clicks on selection controls presented on the display 118 indicating that they are selecting the digital images 108 ranked one, two, five, and seven, respectively, for additional action. The user 104 may also click on a "mail to friend" control, indicating that the four selected digital images 108 are to be sent as attachments to an e-mail to a predetermined recipient.

Block 812 performs one or more actions based on the selected digital images 108. In the present example, the image module 114 signals an e-mail application module 520 of the user device 102, and communicates the four selected digital images 108 thereto. Thus, the e-mail application module 520 opens its own user interface 116 and queries the user 104 for recipient identification or other information needed to format or prepare the e-mail message, which is then sent by way of the one or more networks 120. The e-mail message includes the four selected digital images 108.

The e-mail application module 520 then closes or minimizes, returning the user 104 to the user interface 116 provided by the image module 114. The user 104 may then chose to perform other actions regarding the ranked digital images 108, actuate the exit control 312, and so forth.

Figure 9:
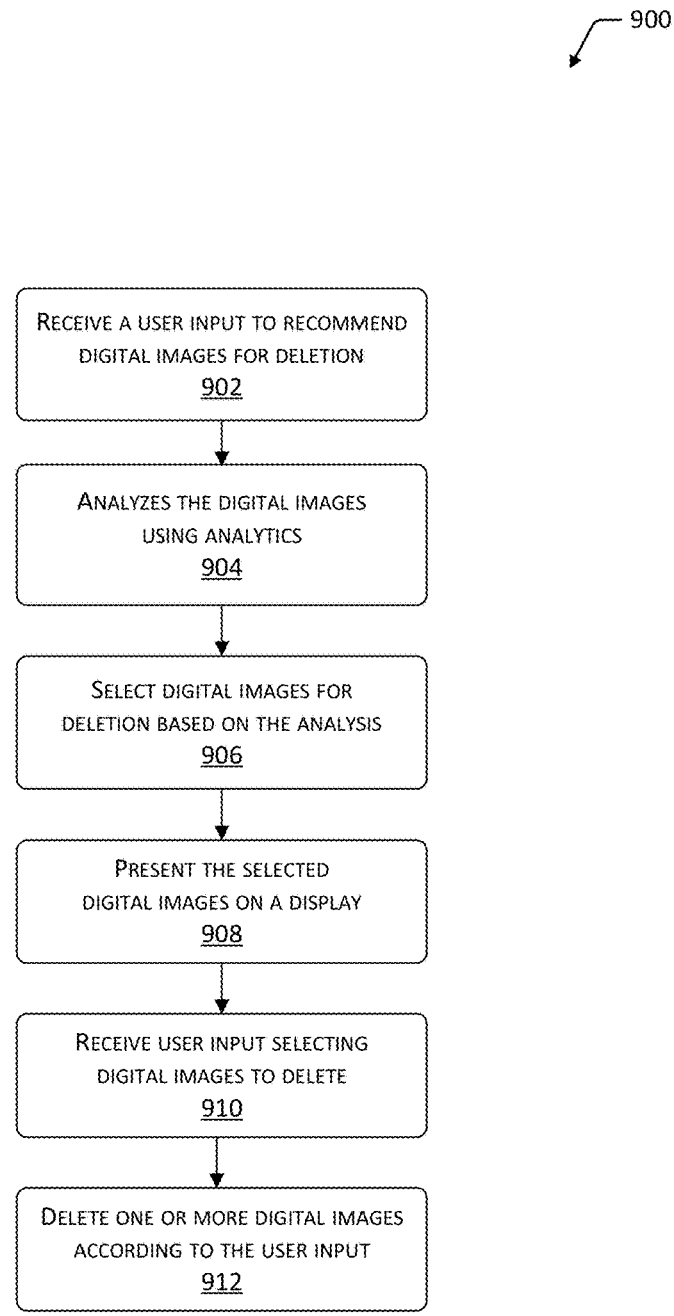
FIG. 9 is a flow diagram of an illustrative process including the evaluating and selecting of digital images for deletion.

FIG. 9 is a flow diagram 900 illustrating a process including recommending digital images 108 for deletion. The process of the flow diagram 900 is illustrative and non-limiting, and other processes including one or more other steps, omitting one or more of the depicted steps, or proceeding in other orders of execution, may also be used.

Block 902 receives a user input 208 to recommend digital images 108 for deletion. For purposes of a present example, the user 104 operates a user device 102 including an image module 114. The user 104 initiates operation of the image module 114 such that a user interface 116 is presented on a display 118. The user 104 then actuates controls of the user interface 116 requesting a recommendation for digital images 108 to consider for deletion. That is, the user 104 is seeking to have digital images of lesser or poor quality or appeal presented such that they may be selected for deletion from storage.

Block 904 analyzes the digital images 108 using analytics 202. In the present example, the image module 114 accesses digital images 108 stored within image data 110 of the user device 102. The image module 114 then employs analytics 202 to evaluate each of the digital images 108 toward detecting blurriness, underexposure, overexposure, cut-off subject matter 112, or other undesirable characteristics. Various detection techniques, heuristics, and so forth may be used. For instance, five hundred digital images 108 may be analyzed in accordance with the user 104 request.

Block 906 selects digital images 108 for deletion based on the analysis. In the present example, the image module 114 flags or otherwise tracks specific ones of the digital images 108 in accordance with characteristics detected during the analysis at 904 above. For instance, the image module 114 flags seventy-one of the digital images 108 for deletion based on detected "flaws" or other characteristics.

Block 908 presents the selected digital images 108 on a display 118. In the present example, the image module 114 presents the seventy-one flagged digital images 108 on the display 118 of the user device 102. Thumbnail images may be presented, wherein particular digital images 108 may be clicked on or otherwise selected for full-screen viewing, and so on. Other operations directed to user 104 viewing of the recommended digital images 108 may also be performed.

Block 910 receives user 104 input selecting digital images 108 to delete. In the present example, the user 104 actuates controls, clicks on selection boxes, or performs other input actions so as to select one or more of the seventy-one presented digital images 108. For instance, the user may select a total of fifty of the digital images 108 for deletion. The user 104 may thereafter actuate an execute control 310.

Block 912 deletes one or more digital images 108 according to the user 104 input. In the present example, the image module 114 causes the fifty user-selected digital images 108 to be deleted from the image data 110 of the user device 102.

The deletion operation may be reversible, or not, in accordance with operating system 516 options or other factors. In this way, the user 104 may timely consider and delete a significant number of digital images 108, while avoiding the tedium and potentially error-prone process of visually evaluating a much greater set of digital images 108. For instance, in the illustration described above, the user 104 was able to avoid visually examining over four hundred digital images 108 due to the automated nature of the analysis and recommendation process.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. An apparatus comprising:
one or more hardware processors; and
one or more memory devices storing computer-executable instructions, the computer-executable instructions causing the one or more hardware processors to:

provide a user interface, the user interface including a plurality of digital images and a plurality of criteria for selection;

receive, via the user interface, a selection of at least a subset of the plurality of digital images;

receive, via the user interface, user input providing a selection of one or more criteria of the plurality of criteria from criteria options presented on the user interface, wherein the one or more criteria specify an objective for analyzing the at least a subset of the plurality of digital images according to visual characteristics and non-visual characteristics of the at least a subset of the plurality of digital images;

select, based on the objective specified by the one or more criteria, a heuristic from a plurality of heuristics;

analyze, using the heuristic, the at least a subset of the plurality of digital images by comparing the at least a subset of the plurality of digital images to each other digital image in the at least a subset of the plurality of digital images in accordance with the visual and non-visual characteristics, the comparing generating scores that quantify the visual and non-visual characteristics for each digital image of the at least a subset of the plurality of digital images in accordance with the objective specified by the one or more criteria selected via the user interface;

determine, based on the analysis, ranking values associated with the at least a subset of the plurality of digital images, the ranking values including the scores that quantify the visual and non-visual characteristics for each digital image of the at least a subset of the plurality of digital images relative to the visual and non-visual characteristics for each other digital image of the at least a subset of the plurality of digital images;

determine one or more digital images of the at least a subset of the plurality of digital images having a score greater than the scores associated with each other digital image of the at least a subset of the plurality of digital images;

cause the one or more digital images and information regarding the one or more digital images to be presented via a display;

receive the user input regarding at least one digital image of the one or more digital images, the user input selecting the at least one digital image of the one or more digital images; and use machine learning to determine a learned operation to automatically perform with respect to the at least one digital image selected based on the user input.

2. The apparatus of claim 1, wherein:
the visual characteristics further include one or more of cut-off subject matter, as indicated by a portion of an object that extends outside of a frame of the one or more digital images of the at least a subset of the plurality of digital images or include one or more of an aesthetic characteristic or a specific content, and the ranking values are further determined based at least in part on a presence or absence of the cut-off subject matter or on a presence or absence of the aesthetic characteristic or a specific content.

3. The apparatus of claim 1, further comprising:
receiving, via the user interface, a selection of one or more of the non-visual characteristics from a plurality of predefined characteristics, wherein the non-visual characteristics further include metadata and audio criteria; and determining, based at least in part on the selected one or more of the non-visual characteristics, the ranking values that include scores that quantify the one or more of the non-visual characteristics for each digital image of the one or more digital images relative to the one or more non-visual characteristics of each other digital image of the one or more digital images.

4. The apparatus of claim 1, further comprising computer-executable instructions to:
determine a first remote computing device of a plurality of computing devices that corresponds to a first score associated with a first digital image of the one or more digital images;

communicate the first digital image to the first remote computing device based on the first score;

determine a second remote computing device of the plurality of computing devices that corresponds to a second score associated with a second digital image of the one or more digital images; and communicate the second digital image to the second remote computing device based on the second score.

5. A method, comprising:
providing a user interface, the user interface including a plurality of digital images for selection and a plurality of criteria;

receiving, via the user interface, a selection of at least a subset of the plurality of digital images;

receiving, via the user interface, user input providing a selection of one or more criteria of the plurality of criteria from criteria options presented on the user interface, wherein the one or more criteria specify an objective for analyzing the at least a subset of the plurality of digital images according to visual characteristics and non-visual characteristics of the at least a subset of the plurality of digital images;

determining, based on the objective specified by the one or more criteria, a heuristic from a plurality of heuristics;

analyzing, using one or more computing devices including one or more hardware processors, the at least a subset of the plurality of digital images by comparing the at least a subset of the plurality of digital images to each other digital image in the at least a subset of the plurality of digital images in accordance with visual and non-visual characteristics, the comparing generating ranking values including scores that quantify the visual and non-visual characteristics for each digital image of the at least a subset of the plurality of digital images relative to the visual and non-visual characteristics for each other digital image of the at least a subset of the plurality of digital images in accordance with the heuristic;

ranking the at least a subset of the plurality of digital images according to the scores;

presenting the at least a subset of the plurality of digital images on a display in accordance to the ranking;

selecting, using at least one of the one or more computing devices, one or more digital images of the at least a subset of the plurality of digital images presented on the display; and determining, using machine learning, a learned operation to automatically perform on the selected at least one of the one or more digital images using the one or more computing devices.

6. The method of claim 5, further comprising
receiving, via the user interface, a selection of the non-visual characteristics from a plurality of predefined non-visual characteristics, wherein the non-visual characteristics further include metadata and audio criteria; and
determining, based at least in part on the non-visual characteristics, the ranking values that include scores that quantify the non-visual characteristics for each digital image of the one or more digital images relative to the non-visual characteristics of each other digital image of the one or more digital images.

7. The method of claim 5, further comprising:
receiving, via the user interface, a selection of the visual characteristics from a plurality of predefined visual characteristics, wherein the plurality of predefined visual characteristics further includes one or more of an aesthetic characteristic or a subject matter content of the plurality of digital images; and
determining, based at least in part on the one or more of the aesthetic characteristic or the subject matter content, the ranking values that include scores that quantify each digital image of the one or more digital images relative to each other digital image of the one or more digital images.

8. The method of claim 5, further comprising receiving the user input providing the selection of the one or more criteria specifying the objective for analyzing the at least a subset of the plurality of digital images by quantifying the visual characteristics based on the user input.

9. The method of claim 5, wherein analyzing the at least a subset of the plurality of digital images further includes detecting cut-off subject matter within the at least a subset of the plurality of digital images, the method further comprising determining the ranking values based at least in part on the detecting of the cut-off subject matter, the ranking values including scores that quantify the cut-off subject matter of each digital image of the one or more digital images relative to each other image of the one or more digital images.

10. The method of claim 5, wherein analyzing the at least a subset of the plurality of digital images further includes detecting an undesirable visual characteristic within the at least a subset of the plurality of digital images, the method further comprising determining the ranking values based at least in part on the detecting of the undesirable visual characteristic, the ranking values including scores that quantify the undesirable visual characteristic of each digital image of the one or more digital images relative to each other image of the one or more digital images.

11. The method of claim 5, further comprising:
determining a first non-transitory computer-readable storage medium of the one or more computing devices that corresponds to a first score associated with a first digital image of the one or more digital images;
communicating the first digital image to the first non-transitory computer-readable storage medium based on the first score;
determining a second non-transitory computer-readable storage medium of the one or more computing devices that corresponds to a second score associated with a second digital image of the one or more digital images; and
communicating the second digital image to the second non-transitory computer-readable storage medium based on the second score.

12. The method of claim 5, further comprising accessing one or more of the plurality of digital images from one or more non-transitory computer-readable storage media associated with a digital camera configured to provide digital image data to at least one of the one or more computing devices.

13. The method of claim 5, wherein analyzing the at least a subset of the plurality of digital images further includes evaluating one or more of color balance, exposure, or contrast of the at least a subset of the plurality of digital images, the method further comprising determining the ranking values based at least in part on the evaluating of the one or more of the color balance, the exposure, or the contrast, the ranking values including scores that quantify the one or more of the color balance, the exposure, or the contrast of each digital image of the one or more digital images relative to each other image of the one or more digital images.

14. The method of claim 5, wherein the selected heuristic uses a machine learning technique that is based at least in part on the user input to the one or more computing devices, and wherein the user input corresponds to one or more of the operation or the one or more visual criteria.

15. The method of claim 5, wherein analyzing the at least a subset of the plurality of digital images further includes detecting a compositional characteristic within the one or more digital images, and wherein the compositional characteristic includes one or more of the rule of thirds, a Moiré pattern, an illusion of motion of an object, or a background out of focus relative to a primary object, the method further comprising determining the ranking values based at least in part on the detecting of the compositional characteristic, the ranking values including scores that quantify the compositional characteristic of each digital image of the one or more digital images relative to each other image of the one or more digital images.

16. The method of claim 5, wherein causing the operation to be performed includes causing the one or more digital images to be deleted from one or more non-transitory computer-readable storage media without user intervention.

17. One or more non-transitory computer readable storage media including a program code, the program code configured to cause one or more hardware processors to:
access a plurality of digital images;
provide a user interface, the user interface including a plurality of criteria for selection, the plurality of criteria specifying an objective for analyzing the plurality of digital images according to visual characteristics and non-visual characteristics of the at least a subset of the plurality of digital images;
receive, via the user interface, user input selecting one or more criteria of the plurality of criteria to use for analysis;
select one or more heuristics based on the objective specified by the selected one or more criteria;
analyze, using the one or more heuristics, the plurality of digital images by comparing the at least a subset of the plurality of digital images to each other digital image in the at least a subset of the plurality of digital images in accordance with the visual and non-visual characteristics;
determine, based on the analysis, ranking values associated with the plurality of digital images, the ranking values including scores that quantify the visual and non-visual characteristics for each digital image of the plurality of digital images relative to the visual and non-visual characteristics of each other digital image of the plurality of digital images;

determine one or more digital images of the plurality of digital images having a score greater than the scores associated with each other digital image of the plurality of digital images;

cause, based on the analysis, presentation of the one or more digital images of the plurality of digital images;

receive a user input for selecting at least one digital image of the one or more digital images; and determine, using machine learning, a learned operation to automatically perform with respect to the selected at least one digital image of the one or more digital images of the plurality of digital images.

18. The one or more non-transitory computer readable storage media of claim 17, wherein the visual characteristics include a placement of a first object relative to a placement of one or more other objects and the ranking values are determined based at least in part on the placement of the first object relative to the placement of the one or more other objects.

19. The one or more non-transitory computer readable storage media of claim 17, the program code further configured to cause the one or more hardware processors to detect a particular object within the plurality of digital images, wherein the ranking values are determined based at least in part on detection of the particular object.

20. The one or more non-transitory computer readable storage media of claim 17, wherein the visual characteristics further include a compositional characteristic within the plurality of digital images, the compositional characteristic includes one or more of the rule of thirds, a Moiré pattern, an illusion of motion of an object, or a background out of focus relative to a primary object, and the non-visual characteristics further include metadata and audio criteria.

* * * * *